Jan. 13, 1970 T. W. MOORE ET AL 3,489,920
OVERVOLTAGE AND UNDERVOLTAGE DETECTION CIRCUIT MEANS
Filed Nov. 15, 1966
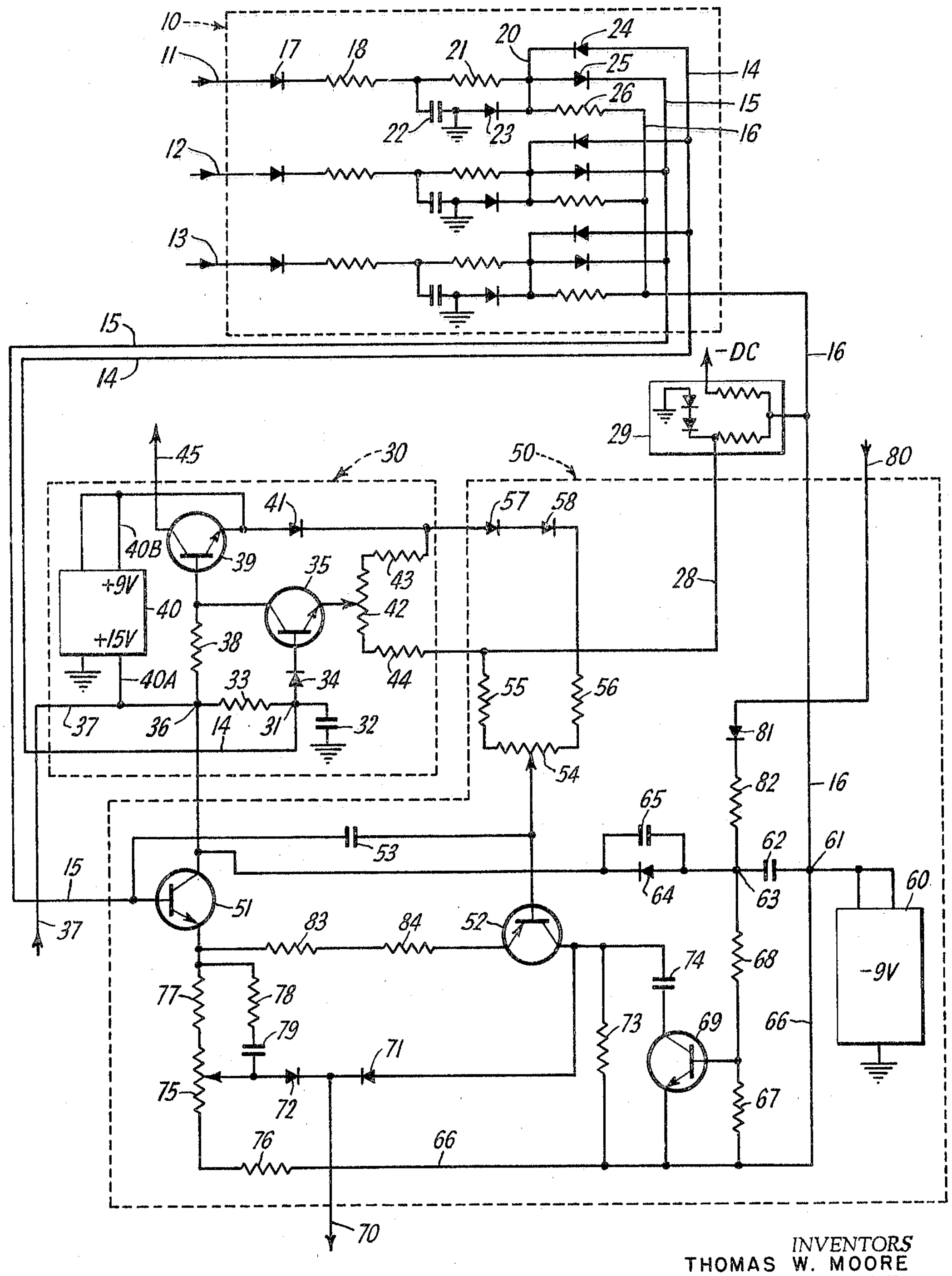
INVENTORS
THOMAS W. MOORE
DONALD S. FRITZ
BY Charles J. Worth
AGENT 3,489,920

OVERVOLTAGE AND UNDERVOLTAGE DETECTION CIRCUIT MEANS

Thomas W. Moore, Dayton, and Donald S. Fritz, Xenia, Ohio, assignors to American Machine & Foundry Company, a corporation of New Jersey Filed Nov. 15, 1966, Ser. No. 594,508
Int. Cl. H03k 5/20
U.S. Cl. 307—235 10 Claims

ABSTRACT OF THE DISCLOSURE

Overvoltage and undervoltage detecting circuit means for phase voltages, means for establishing an operating threshold for each circuit means and having a vernier control for adjusting the established threshold, and the overvoltage circuit means being a tripartite network array in which each network operates within a different range thereby providing a time delay which varies over a broad time range inversely with limited error voltage changes.

This invention relates generally to power monitoring systems and particularly to overvoltage and undervoltage circuit means incorporated in such systems.

An object of the present invention is to provide circuit means for producing output signals in response to low level analogue signals representing sensed A.C. phase voltages when the analogue signals indicate overvoltage or undervoltage conditions in excess of an allowable predetermined range.

Another object of the present invention is to provide the aforementioned means comprising an overvoltage and undervoltage detection circuits each with a predetermined threshold establishing the limits of the allowable range of voltage error.

Another object of the present invention is to provide each of the aforementioned circuits with a vernier control for adjusting its threshold.

Still another object of the present invention is to provide an overvoltage detector circuit having a tripartite network array to accomplish circuit operation with a time delay function which varies over a broad time range inversely with change over a limited range of the error voltage.

And another object of the present invention is to provide the aforementioned overvoltage detector circuit with time delay means to prevent developing output signals until circuit operating norm conditions are attained.

The present invention contemplates solid state circuit means comprising overvoltage and undervoltage circuits. The overvoltage circuit has a tripartite network array to develop an output signal in response to a low level analogue signal representing an A.C. phase voltage when the analogue signal exceeds its value for a maximum allowable overvoltage condition. The network array has a time function which varies over a broad time range inversely with changes over a limited range of the overvoltage error signal. Means for establishing a circuit threshold corresponding to the input to the network array at maximum allowable overvoltage condition is connected to the network array and provides a vernier control for varying the threshold. The undervoltage circuit has conducting means for providing an output signal in response to a low level analogue signal representing an A.C. phase voltage when the analogue signal exceeds its value for a maximum allowable undervoltage condition. Means for establishing a circuit threshold corresponding to the input to the conducting means at maximum allowable undervoltage condition is connected to the conducting means and provides a vernier control for varying the threshold.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for illustrating purposes only and is not to be construed as defining the limits of the invention.

The single figure of the drawing is a circuit diagram of the novel apparatus made in accordance with the present invention.

Referring now to the drawing, a voltage sensor and harmonic control circuit 10 is provided with three input lines 11, 12 and 13, each for receiving one of three A.C. voltages nominally 120° out of phase with one another. Each of the three A.C. voltages are filtered to attenuate harmonics thereof, and are sampled on the half wave to provide an analogue or D.C. output proportional to the fundamental value. The three resulting analogue outputs are monitored, and only the one of lowest value is supplied to an undervoltage sensor circuit 30 by an output line or conductor 14 while only the one of highest value is supplied to an overvoltage sensor circuit 50 by an output line or conductor 15. Each of the analogue outputs supplied to undervoltage and overvoltage sensor circuits 30 and 50, respectively, are substantially uneffected by the other two outputs.

The voltage sensor and harmonic control circuit 10 is the subject matter of the copending U.S. patent application, S.N. 462,480, filed June 9, 1965 by T. W. Moore and assinged to the same assignee as is the present application. Briefly however, for circuit 10 to accomplish the requisite filtering and sensing, each of the input lines 11, 12 and 13 is connected by circuitry to both conductors 14 and 15, and to a Zener regulated negative reference voltage source 60 by a conductor 16. Inasmuch as the same circuitry is provided for each of the input lines, only the circuitry connected to line 11 will be briefly described.

As shown, input line 11 is connected to a common conductor 20 by a diode 17 connected in series with series connected resistors 18 and 21. A capacitor 22, provided to complete an R.C. network, is connected at one side between resistors 18 and 21, and at its other side to ground and to the anode of a diode 23 which is cathode connected to the conductor 20.

A pair of diodes 24 and 25, disposed in opposite relation to one another, connect conductors 14 and 15, respectively, to the common conductor 20 and monitor the resulting analogue output. The Zener regulated negative reference voltage, from source 60, provided to the sensor and control circuit 10 is applied to the resulting D.C.

potential across a resistor 26 which connects conductor 16 to the common conductor 20.

Source 60 of the Zener regulated negative reference voltage, which for illustrative purposes only in this instance is −9V, is shown in the drawing as being located within the overvoltage sensor circuit 50 and is connected to conductor 16 at a junction 61. A power source 29, connected to conductor 16, is connected by a conductor, in circuit 50, to resistors 44 and 55 to provide a dual diode negative reference bias. A power input line 37 is connected to a Zener regulated positive reference voltage source 40 in circuit 30 in the drawing, the positive reference voltage, for illustrative purposes only in this instance, is +15V at output 40A and is + 9V at output 40B.

Conductor 14 from circuit 10 is connected in the undervoltage sensor circuit 30 to a junction 31 which is connected to ground by a capacitor 32, to a junction 36 by a resistor 33, and to the base of a transistor 35 by a diode 34. The power input line 37, connected to the Zener regulated positive reference voltage source 40, is connected to junction 36 which is connected by a resistor 38 to the collector of transistor 35 and the base of a transistor 39.

A variable resistance is provided by a potentiometer 42 connected in series between resistors 43 and 44. The emitter of transistor 35 is connected to the wiper of potentiometer 42 while, as previously stated, resistor 44 is connected to the negative diode bias at power source 29 and to resistor 55 in circuit 50.

The collector of transistor 39 is connected to a time delay signal output line 45 while the emitter thereof is connected to the +9V output 40B of the positive reference voltage source 40, and by a diode 41 to resistor 43.

The operation of the undervoltage circuit 30 is explained, as follows. The positive reference power supply module 40, at output 40A provides, by means of resistor 38, collector energy for transistor 35 which is base biased to normally conduct. Such base bias, also provided at output 40A which is connected to junction 31 by resistor 33, is applied by diode 34 and must exceed the emitter reference potential provided by potentiometer 42 to drive transistor 35 to conduct.

With transistor 35 conducting, the potential at its collector which is base connected to transistor 39 is low. Thus, transistor 39 is not conducting and no signal is provided at output line 45. The negative analogue signal representative of the lowest A.C. phase voltage is a low level high impedance signal provided at junction 31 by input line 14, and further filtered by capacitor 32. When this input signal provided by line 14 is of sufficient magnitude to override or reduce the base bias, provided through resistor 33 below, the level of the emitter reference potential, provided by potentiometer 42 and its associated calibrating resistors 43 and 44, transistor 35 will cease to conduct.

When transistor 35 ceases to conduct, the collector voltage increases and provides a base drive for transistor 39, which conducts heavily and provides an output signal at line 45 which is collector connected. The base voltage to cause transistor 39 to conduct must exceed 9V which is the emitter potential provided output 40B of the positive reference power supply module 40.

As previously stated, the emitter reference potential for transistor 35 is provided by the resistance network comprising potentiometer 42 and the associated resistors 43 and 44. Resistor 43 is connected by diode 41 to the +9V output 40B of the regulated power source 40 while resistor 44 is connected by line 28 to the negative D.C. bias source 29 consisting of two diodes maintained in conduction by a resistance to the −9V Zener regulated reference source 60.

It should be readily understood that transistor 35 conducts only when the net voltage input at junction 31 exceeds the emitter reference potential be enough to provide for the voltage drop across the emitter-base of transistor 35 plus diode 34. Varying the setting of potentiometer 42 will provide changes in the emitter reference level and, accordingly, provide a vernier control for adjusting the threshold of the undervoltage circuit 30, or the reference level at which an output signal will be provided at line 45. The basic level for the circuit 30 is established by the negative Zener level and the parameters of circuit 10.

Since the voltage drop across the emitter-base of transistor 35 and across diode 34 changes with temperature change, compensation therefor is provided by returning the reference circuit to a point maintained at a value of two diode drops below ground. In other words, connecting output 40B to power source 29. The inclusion of diode 41 is for modification of such compensation to provide optimum perfrmance over the adjustment range provided by potentiometer 43.

The overvoltage circuit 50 and its operation is more complex, and it involves circuit elements for matching actuation time to various levels of indicated voltage error. Specifications for this type of device usually require three actuation levels. One level required is for steady state performance, when most transient activity has subsided. A second required level is based on operation for a very brief specified time period where, after a very short time high transient it is necessary to disconnect equipment in a minimum amount of time. The third is an intermediate zone where permitted time varies inversely to changes in magnitude of the overvoltage. All of these time related functions are merged into each other so that they, in total, constitute a continuous voltage-time curve.

To rephrase the foregoing, the highest transient condition must have a definite voltage-time relation to avoid nuisance operation as well as system damage; there must be a progressive voltage-time curve relationship for intermediate transients, and a steady state value for "ultimate trip" to protect against long-time drift in components or adjustment errors.

Referring again to the drawing, conductor 15, from circuit 10, is connected in the overvoltage sensor circuit 50 to the base of a transistor 51, and by a capacitor 53 to the interconnected base of a transistor 52 and wiper of a potentiometer 54. Potentiometer 54 is connected in series between resistors 55 and 56. As previously stated, resistor 55 is connected to resistor 44 of circuit 30 and to the negative bias source 29 by line 28, while a pair of series connected diodes 57 and 58 provide a connection from between diode 41 and resistor 43 of circuit 30 to resistor 56.

Junction 61 is connected by a capacitor 62 to a second junction 63. A diode 64 and a capacitor 65, connected in parallel with one another connect junction 63 to the collector of transistor 51 which is connected to junction 36 of circuit 30. A conductor 66 is connected to junction 61 and a resistor 67 which is connected in series with a resistor 68 connected to junction 63.

The base of a transistor 69 is connected between series connected resistors 67 and 68 while its emitter is connected to conductor 66.

A logic signal output line 70 is connected between opposed diodes 71 and 72. Diode 71 is connected to the collector of transistor 52 which is connected by a resistor 73 to conductor 66, and a capacitor 74 to the collector of transistor 69. Diode 72 is connected to the wiper of a potentiometer 75 which is connected in series between resistors 76 and 77.

Resistor 76 is connected to conductor 66 while resistor 77 is connected to the emitter of transistor 51 which is connected by a resistor 78 in series with a capacitor 79 to the wiper of potentiometer 75. The emitters of transistors 51 and 52 are connected to each other by series connected resistors 83 and 84. A D.C. signal input line 80 is connected to junction 63 by a diode 81 in series with a resistor 82.

Undesirable error voltages may occur in the start-up mode of circuit 50, caused by capacitive elements or switching spikes. With no excitation at junction 63, transistor 69 lacks drive current and is nonconductive. It then follows that capacitor 74 is ungrounded and any error voltage appearing at its positive terminal is conducted by diode 71 to output line 70 as a premature output signal.

To prevent such spurious signal output upon start-up, the rising voltage from power input line 37 is conducted through capacitor 65 to junction 63 producing a momentary voltage across capacitor 62 to line 66 which is attenuated by resistors 67 and 68, and provides a momentary base drive for transistor 69. This provides circuit damping during start-up and acceleration and prevents shut down or error signal output due to harmless noise signals or error signals.

When the level of input voltage from power input line 37 reaches the Zener level of the Zener regulated power source 40, or the D.C. level of circuit 50 at the collector of transistor 51, capacitor 65 ceases to pass current and becomes inactive until start-up conditions are repeated. With capacitors 65, and 62, inactive, transistor 69 returns to its nonconductive mode. Thus, capacitor 74 again is ungrounded or is an inactive element. Diode 64 is connected in parallel with and prevents negative voltages from appearing across capacitor 65.

If performance is normal, line 80 is energized externally to provide a D.C. voltage at junction 63 which is filtered by capacitor 62 and provides a continuous drive current to the base of transistor 69 to maintain it in a conducting mode. Current also flows through diode 64 from junction 63 to the power source 40, removing the charge of capacitor 65. Any subsequent faults must now act on circuit 50 to provide an output signal at line 70 in accordance with the pre-established voltage/time curve as previously discussed.

In operation, line 80 is energized and transistor 69, accordingly, is conducting and the collector voltage of transistor 51 is the Zener regulated voltage from output 40A, or +15V. Input line 15 is connected to and applies a high impedance positive analogue signal, representative of the highest A.C. phase voltage, to the base of transistor 51 and tracking capacitor 53. Capacitor 53 functions as a dynamic filter for the input signal because it is connected to the reference potential established by the voltage divider network connected to the base of transistor 52 instead of ground.

The reference potential or threshold of circuit 50 at the base of transistor 52 is established by the voltage divider network, formed by potentiometer 54 and the associated calibrating resistors 55 and 56 in the same manner as in the undervoltage circuit 30. The approximate values for the input by line 15 are established by the parameters of filter circuit 10 and the Zener reference source 60 for which potentiometer 54 provides a simultaneous vernier adjustment together with such adjustment of the threshold of circuit 50.

Transistor 51 functions as an emitter follower and its emitter potential on a steady state basis is essentially that of the base input but at a lower impedance level. The operation of transistor 52 is unique in that conduction takes place from emitter to collector and into the load circuit only when the emitter potential exceeds the base potential. The voltage-inverse time curve, as should be readily understood, is dependent upon the values of resistors 83, 84 and 73, and the charging rate of capacitor 74. Resistor 73 acts as a load across capacitor 74 to provide a controlled slow discharge.

As previously stated, transistor 52 conducts from emitter to collector only when its emitter potential exceeds the threshold. This excess represents an overvoltage condition beyond the allowable range. Thus, when the voltage across capacitor 74 rises significantly, a signal is developed through diode 71 and presented at conductor 70 as an output signal adequate for the purposes for which it is required.

For short intermediate level transients, resistor 78 and capacitor 79 bypass part of resistors 77 and 75, depending partly upon the setting of potentiometer 75. The voltage-time characteristics of this intermediate level bypass network are established by the values of resistor 78 and capacitor 79. The output signal is now developed directly through diode 72, and the normal time delay network, consisting of transistor 52, capacitor 74 and resistors 73, 83 and 84, is completely bypassed.

For very fast high voltage transients, the time delay is established primarily by the impedance levels of the input filter 10 and the value of capacitor 53. The value of voltage at the emitter of emitter-follower 51 rises sufficiently high that the precise values of resistors 75 or 78 and capacitor 79 are not of major concern and an output signal is rapidly developed through diode 72 to line 70. Minor adjustments of the trip point may be accomplished by potentiometer 75.

The transition between each of the three time delay functions takes place gradually rather than a step function and results in a continuous error time curve. The shape of the curve can be changed by varying circuit parameters.

Since on the functions of the overvoltage detecting circuit 50 is to prevent activation of certain logic elements (not shown) in response to output signals representing real overload conditions, only start-up time delays are incorporated in circuit 50. Thereafter, when desired conditions are met, a logic signal is provided by line 80, from means not shown, which results in driving transistor 69 to its conducting mode, as previously discussed, which represent the operating norm for circuit 50 and inverse timing now can be accomplished by the three networks, as described. The purpose of providing a tripartite inverse timing network array in circuit 50 is to accomplish circuit performance in a broad time range, for example from 30 seconds to 1/100 of a second, with less than 75% increase in low level error voltage input. This cannot be accomplished with a single stage R.C. network, particularly where the voltage-inverse time delay curve must be shaped to accommodate other circuit parameters.

Although but a single embodiment of the invention has been illustrated and described in detail, it is to be expressely understod that the invention is not limited thereto. Various changes may also be made in the design and arrangement of the parts without departing from the spirit and scope of the invention as the same will now be understood by those skilled in the art.

We claim:

1. Overvoltage and undervoltage detection circuit means comprising:

a tripartite overvoltage network array with an overvoltage threshold having an input to receive DC voltage and an output to provide signals when the input voltage exceeds said overvoltage threshold;

means for establishing said overvoltage threshold to substantially correspond to input voltage of said network array when analogue signals at the said network represent an AC phase voltage within a maximum allowable overvoltage condition;

means connected to the input of the network array to provide low level analogue signals representing an AC phase voltage;

the network array having means to provide a time delay function which varies inversely with changes of the analogue signals when the input voltage exceeds said overvoltage threshold and each of the three networks of said network array operating in a range different from the ranges of the other two of the networks;

an undervoltage circuit with an undervoltage threshold havng an input to receive DC voltage and an output to provide output signals when the DC input voltage exceeds said undervoltage threshold;

means for establishing said operating undervoltage threshold to substantially correspond to the input DC voltage when analogue signals at said circuit input represent AC phase voltage within a maximum allowable undervoltage condition; and each of the means establishing a different one of said thresholds being adjustable to provide a vernier control for varying the threshold which it establishes.

2. The circuit means in accordance with claim 1, wherein:

the means connected to the input of the network array is an emitter follower having a base connection to receive the analogue signals and an emitter connected to each of the networks of said network array;

the first network being operative in a range where the analogue signals cause slow rising low error voltages at the input of the network array in excess of the overvoltage threshold;

the second network being operative in a range where the analogue signals cause rapid high error voltages at the input of the network array; and the third network being operative in an intermediate range between the ranges of the first and second networks.

3. The circuit means in accordance with claim 2, wherein the first network comprises:

a transistor having an emitter, a collector and a base, and which conducts from emitter to collector when the emitter potential exceeds the base potential;

a resistance voltage divider including a potentiometer connected to the transistor base and providing a potential thereto establishing the threshold of the network array;

the potentiometer being adjustable to vary the base potential and change the threshold of the network array;

resistance means connecting the emitters of the emitter follower and transistor to each other;

a resistance and a capacitance connected in parallel between the transistor collecter ond a regulated source of negative D.C. voltage; and a diode connecting the transistor collector to output of the network array and passing output signals when the transistor conducts and charges the capacitance.

4. The circuit means in accordance with claim 2, a first transistor having an emitter, a collector and a base, and which conducts from emitter to collector when the emitter potential exceeds the base potential;

a resistance voltage divider including a potentiometer connected to the base of the first transistor and providing a potential thereto establishing the threshold of the network arrays;

the potentiometer being adjustable to vary the base potential of the first transistor and change the threshold of the network array;

resistance means connecting the emitters of the emitter follower and the first transistor to each other;

a second transistor having a collector and a base, and an emitter connected to a source of regulated negative voltage;

a capacitor connected between the collectors of the first and second transistors, being an inactive element in the network when the second transistor is non-conducting and being an active element when the second transistor is conducting and the network array is operating;

means connected to the base of the second transistor for providing a driving current thereto when the network array is operating;

a resistance connected in parallel with the capacitance and the second transistor between the collector of the first transistor and the source of regulated negative voltage to which the second transistor is connected; and a diode connecting the collector to the output of the network array for passing an output signal when the first transistor conducts and charges the capacitance.

5. The circuit means in accordance with claim 2, wherein the third network comprises:

a resistance and a capacitance connected in series to the emitter of the emitter follower; and a diode connecting the capacitance to the output of the network array.

6. The circuit means in accordance with claim 2, wherein the second network comprises:

a resistance voltage divider including a potentiometer and being connected between the emitter of the emitter follower and a regulated source of negative voltage;

the potentiometer being adjustable to vary the required error voltage at the input of the network array for operation of the second network to provide output signals thereby; and a diode connecting the potentiometer to the output of the network array and passing output signals when provided by the second network.

7. The circuit means in accordance with claim 6, wherein the third network comprises:

a resistance and a capacitance connected in series with one another and in parallel with a portion of the resistance voltage divider between the emitter of the emitter follower and the diode connecting the potentiometer to the output of the network array.

8. The circuit means in accordance with claim 7, wherein the first network comprises:

a transistor having an emitter, a collector and a base, and which conducts from emitter to collector when the emitter potential exceeds the base potential;

another resistance voltage divider including a potentiometer connected to the transistor base and providing a potential thereto establishing the threshold of the network array;

the potentiometer of the other voltage divider being adjustable to vary the base potential and change the threshold of the network array;

resistance means connecting the emitters of the emitter follower and the transistor to one another;

a resistance and a capacitance connected in parallel between the transistor collector and a source of regulated negative voltage; and another diode connecting the transistor collector to the output of the network array and passing output singals when the transistor conducts and charges the capacitance connected thereto.

9. The circuit means in accordance with claim 11, wherein the undervoltage circuit comprises:

a first transistor connected to the circuit input to receive the analogue signals;

a second transistor connected to and controlled by the first transistor, and connected to the circuit output and providing output signals thereto when the second transistor conducts; and the means establishing the circuit threshold being connected to and establishing the driving level of energization of the first transistor so that the first transistor causes the second transistor to conduct and provide output signals when the analogue signals represent an A.C. phase voltage with an undervoltage condition in excess of maximum allowable.

10. The circuit means in accordance with claim 9, wherein:

the second transistor is collector connected to the circuit output, and base to collector connected to the first transistor;

the means establishing the circuit threshold being a resistance voltage divider including a potentiometer emitter connected to the first transistor providing the emitter potential and establishing thereby the circuit threshold;

the potentiometer being adjustable to vary the emitter potential; and the first transistor being base connected to receive a biasing voltage and the analogue signals which negatively exceed the emitter potential when the analogue signals represent the A.C. phase voltage with an undervoltage condition in excess of the allowable maximum to stop conduction by the first transistor and cause thereby the second transistor to conduct.

References Cited

UNITED STATES PATENTS

| | | | |
|---|---|---|---|
| 2,783,453 | 2/1957 | Rose | 328—146 X |
| 2,837,665 | 6/1958 | Edwards. | |
| 3,001,100 | 9/1961 | Schuh et al. | 317—31 |
| 3,037,151 | 5/1962 | Cimerman et al. | 317—31 X |
| 3,243,658 | 3/1966 | Blackburn | 317—31 |
| 3,313,984 | 4/1967 | Hupp | 317—31 X |
| 3,317,747 | 5/1967 | Bryant | 307—235 |
| 3,340,459 | 9/1967 | Fields et al. | 317—33 X |
| 3,383,522 | 5/1968 | Apfelbeck et al. | 307—235 |

JOHN S. HEYMAN, Primary Examiner

J. D. FREW, Assistant Examiner

U.S. Cl. X.R.

317—31, 33; 328—116, 150